United States Patent [19]
Bornstein et al.

[11] 3,922,903
[45] Dec. 2, 1975

[54] HIGH TEMPERATURE AQUEOUS STRESS CORROSION TESTING DEVICE

[75] Inventors: Arthur N. Bornstein, San Jose; Maurice E. Indig, Fremont, both of Calif.

[73] Assignee: The United States of America as represented by the United States Energy Research and Development Administration, Washington, D.C.

[22] Filed: Sept. 27, 1974

[21] Appl. No.: 509,990

[52] U.S. Cl. .................. 73/15.6; 23/253 C; 73/86
[51] Int. Cl.² .................................................. G01N 3/18
[58] Field of Search ........ 73/15.6, 86, 97; 23/253 C

[56] References Cited
UNITED STATES PATENTS

| | | | |
|---|---|---|---|
| 2,763,149 | 9/1956 | Long et al. .................. | 73/97 |
| 2,909,057 | 10/1959 | Ottestad ........................ | 73/97 |
| 3,404,562 | 10/1968 | MacGlasham, Jr. .......... | 73/97 |
| 3,504,535 | 4/1970 | Cobb ............................. | 73/86 |
| 3,718,034 | 2/1973 | Swearingen .................. | 73/86 |

OTHER PUBLICATIONS

McCarthy et al., "Autoclaves for the Study of the Effects of Deformation on the High Temperature Aqueous Corrosion of Metals," in J. Physics E. (G. Britain), Vol. 5, No. 8, 8/72, pp. 790–792.

Taylor et al., "Electrochemical Apparatus for Corrosion Studies in Aqueous Environments at High Temp & Pressure," in Br. Crossion Journal, 11/1969, Vol. 4, pp. 287–292.

*Primary Examiner*—Herbert Goldstein
*Attorney, Agent, or Firm*—Dean E. Carlson; F. A. Robertson; L. E. Carnahan

[57] ABSTRACT

A device for stressing tensile samples contained within a high temperature, high pressure aqueous environment, thereby permitting determination of stress corrosion susceptibility of materials in a simple way. The stressing device couples an external piston to an internal tensile sample via a pull rod, with stresses being applied to the sample by pressurizing the piston. The device contains a fitting/seal arrangement including Teflon and weld seals which allow sealing of the internal system pressure and the external piston pressure. The fitting/seal arrangement allows free movement of the pull rod and the piston.

1 Claim, 3 Drawing Figures

3,922,903

HIGH TEMPERATURE AQUEOUS STRESS CORROSION TESTING DEVICE

BACKGROUND OF THE INVENTION

The invention described herein was made in the course of, or under, Contract No. AT(04-3)-893, Task 10, with the United States Atomic Energy Commission.

This invention relates to an apparatus for testing materials, and more particularly to an apparatus for stressing material contained within a high temperature, high pressure aqueous environment.

With the advent of nuclear power reactors research efforts have been directed to providing materials capable of withstanding the high temperature, high pressure, corrosive environments created thereby. Involved in this research are efforts directed to the stress corrosion cracking behavior of structural materials in high temperature (~550°F) oxygenated water environments containing low chloride levels (<0.1 ppm), for example. Laboratory experience indicates many nonstabilized austentic alloys similar to AISI Types 304 and 316 stainless steels undergo intergranular stress corrosion cracking in the above exemplified environment when tested at high stress levels in the heavily sensitized condition. In nuclear reactors, such sensitization can occur on austenitic alloy components welded to the reactor pressure vessel and subjected to the required ASME code for pressure vessel steel post weld heat treatment (PWHT). Although these stainless steels are susceptible to intergranular stress corrosion cracking when highly stressed in the PWHT condition, they do not undergo stress corrosion cracking in the above environment when used as structural materials at normal reactor design stress levels or in solution annealed material free of grain boundary carbides and surface coldwork, even at very high over design stresses.

When Types 304 and 316 stainless steels are specified for boiling water reactors (BWR) structural and piping applications, the fabrication procedures followed eliminate the necessity for the pressure vessel PWHT. Although these alloys are no longer used for fabrication in the PWHT condition, it is beneficial to use materials inherently immune to intergranular stress corrosion cracking. Therefore, research has been directed to identify and qualify suitable highly resistant alternate alloys for use in reactor structures. For further discussion of the foregoing, see Corrosion, Vol. 29, No. 1, pp. 1-12 (1973) January.

To carry out the research on materials as discussed above apparatus for testing such material is needed, such apparatus being capable of simple and accurate operation in high temperature, high pressure, aqueous environments.

The prior known method used for testing the stress corrosion cracking resistance of materials in high temperature aqueous environments at known applied loads is based on coupling an external piston to a tensile sample contained within a pressure vessel, such being exemplified in the above-cited Corrosion article. In this prior method the system pressure is in hydraulic and thermal contact with the bottom of the external piston with a counter pressure being exerted on the top of the piston by an inert gas, whereby both system pressure and counter pressure must be carefully controlled, which in practice is difficult due to pressure pulse rises above the desired pressure and due to leaks, which cause over stress on the sample or variations of stresses with time. Thus, a need existed in the prior art for a simple yet effective device for high temperature, high pressure, aqueous stress corrosion testing.

SUMMARY OF THE INVENTION

The present invention fills the above-indicated need for a simple yet effective apparatus for high temperature aqueous stress corrosion testing. The stressing device described hereinafter basically couples an external piston to an internal tensile sample via pull rod with fitting means for sealing system pressure from piston pressure. Stresses are applied to the sample by pressurizing the piston. The sealing means contains Teflon and weld seals which allow sealing of the internal system pressure and the external piston pressure. The seals also allow a free movement of the pull rod and the piston. Thus, the herein disclosed device removes the major hydraulic and thermal interaction of the system with the piston and results in a simpler and more reliable means of maintaining a precise stress on a tensile sample.

Therefore, it is an object of this invention to provide a device for stressing tensile samples contained within a high temperature, high pressure system.

A further object of the invention is to provide a device for high temperature aqueous stress corrosion testing.

Another object of the invention is to provide a stressing device which couples an external piston to an internal tensile sample via a pull rod via a seal arrangement which removes hydraulic and thermal interaction of the system with the piston.

Another object of the invention is to provide a simple and reliable device for maintaining a precise stress on a tensile sample.

Other objects of the invention will become readily apparent from the following description and accompanying drawings.

DESCRIPTION OF THE INVENTION

Figure 1:
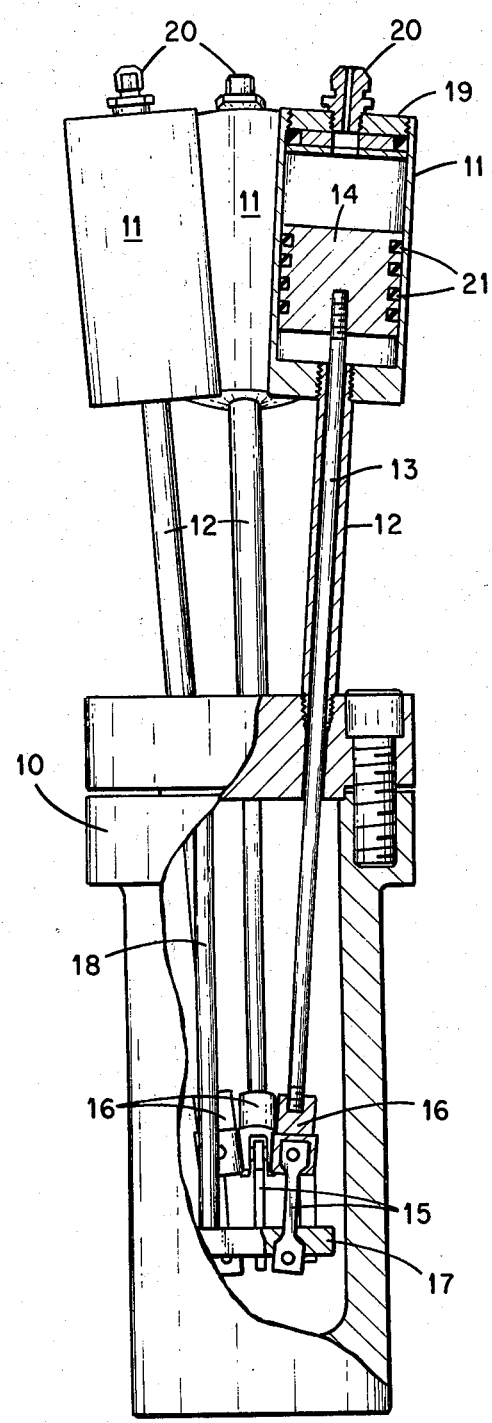
FIG. 1 is a view partially in cross-section of a prior known stressing apparatus.

Prior to a detailed description of the invention a general discussion of the prior known apparatus used for testing the stress corrosion cracking resistance of materials in high temperature aqueous environments at known applied loads is set forth to more clearly illustrate the advancement provided by the present invention. Such a prior known apparatus is illustrated in FIG. 1 and, like the present invention, is based on coupling an external piston to a tensile sample contained within a pressure vessel. Broadly, the FIG. 1 apparatus is composed of pressure vessel 10 having a plurality of externally located piston accumulators or housings 11 connected therewith through nipples or pipes 12, connecting or pull rods 13 extending through each of nipples 12 interconnecting pistons 14 with test specimens 15 via grips 16, with specimens 15 being secured at the opposite end to a bottom plate 17 of support assembly 18 located within pressure vessel 10. The upper end of piston accumulators 11 have top caps 19 connected to an inert gas supply 20.

In the FIG. 1 apparatus, the system pressure (usually >1000 psi) is in hydraulic contact and thermal contact with the bottom of the piston 14 via nipple 12 through which pull rods 13 extend. Since the system pressure transmitted to the bottom of piston 14 results in a fixed stress on the specimen 15 greater than its ultimate tensile strength, a counter pressure must be exerted on the top of piston 14. In a typical application, with a system pressure of 1750 psi, a counter pressure of 1550 psi is exerted through gas supply 20 onto the top of piston 14 by an inert gas, such as argon, which results in a 200 psi pressure differential and a stress of 50,000 psi on a tensile specimen of 0.0125 $in^2$ cross-section. Because the applied stress on the specimen results from maintaining a precise pressure differential, both system pressure and counter pressure must be carefully controlled. In practice this has often been difficult. The system pressure normally pulses and often rises above the desired pressure due to hydraulic constraints. Also, leaks can occur in the counter pressure gas side. These effects can either over stress the sample or at best result in variations of stresses with time. Further, because O-rings 21 (four shown in FIG. 1) which seal the piston 14 against the internal surface of piston housings 11 approach the temperature of the system (500° to 600°F) degradation of the O-rings and/or the piston cylinder walls occur resulting in leakage or excessive frictional losses, which restrains the free movement of the piston. In these cases the specimens are stressed to an unknown value less than the desired level whereby inaccurate measurement results.

Figure 2:
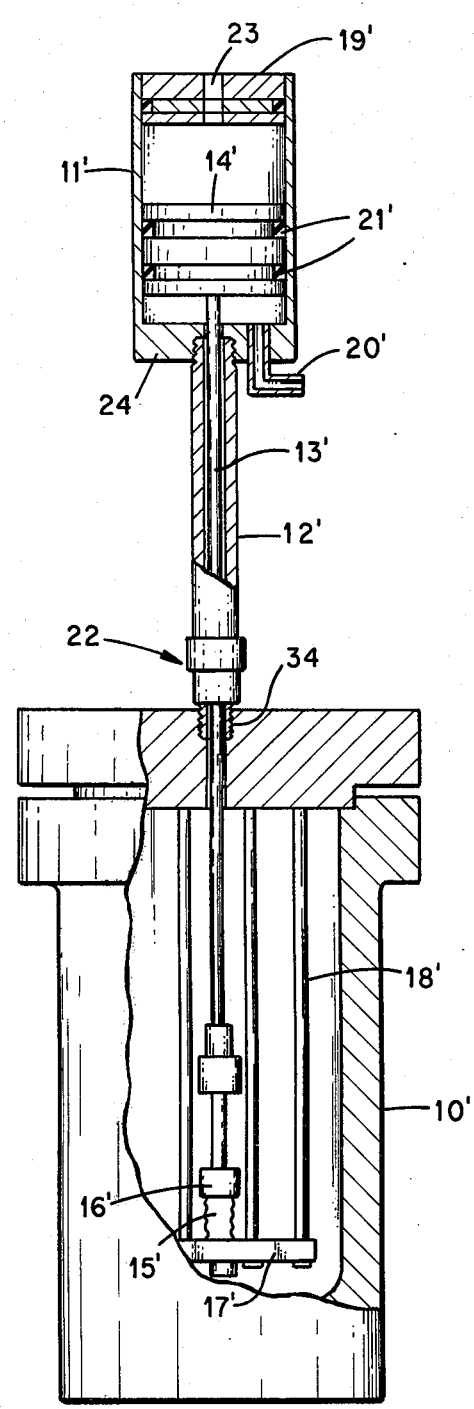
FIG. 2 is a view, partly in cross-section, of an embodiment of a stressing device made in accordance with the invention.
Figure 3:
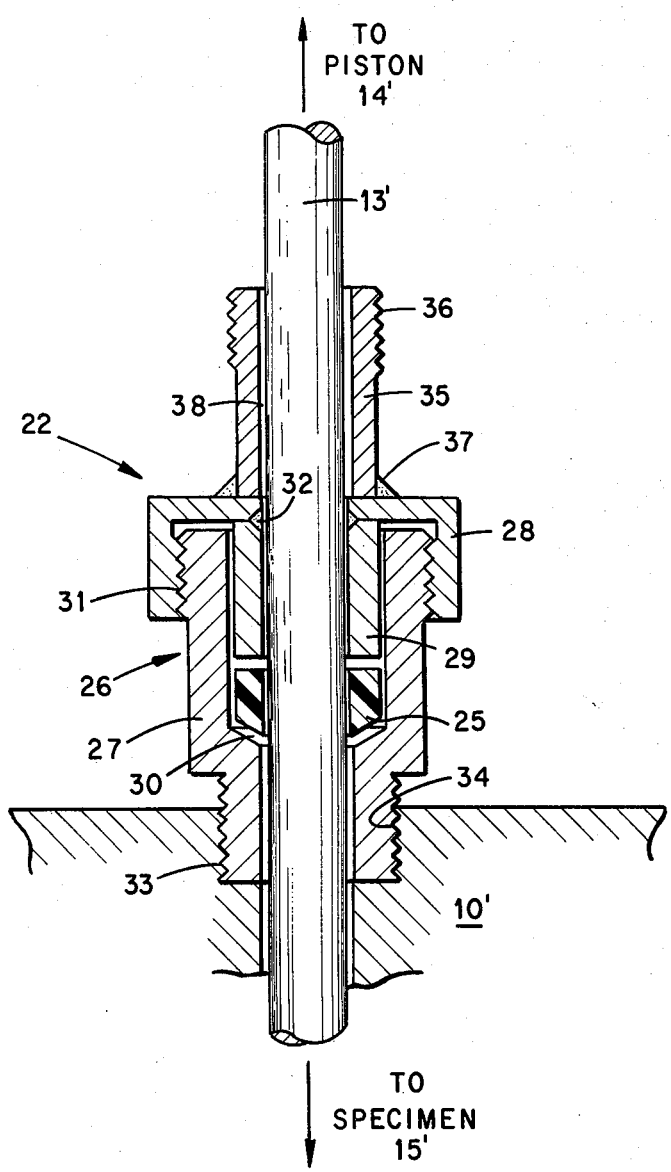
FIG. 3 is an enlarged view of the fixture assembly of the FIG. 2 embodiment.

The present invention, illustrated in FIGS. 2 and 3, removes the above-described major hydraulic and thermal interaction of the system with the piston and results in a simpler and more reliable means of maintaining a precise stress on a tensile specimen. In the stressing device, made in accordance with the invention, the system is sealed thermally and hydraulically from the piston by a fitting assembly while allowing free movement of the pull rod and the piston.

Referring now to FIG. 2, an embodiment of the stressing device is illustrated. While only a single stress assembly is shown for simplicity of description, the device may include a plurality of stress assemblies, as in the FIG. 1 apparatus, and components which generally correspond to those of FIG. 1 will be given similar reference numerals. The FIG. 2 stressing device comprises a pressure vessel 10' having an externally located piston accumulator or housing 11' connected thereto through a nipple or pipe 12' and a fitting-seal assembly 22, the details of assembly 22 being described hereinbelow with respect to FIG. 3. A pull rod 13' extending through nipple 12' and the fitting-seal assembly 22 interconnects a piston 14' in accumulator 11' with one end of a test specimen 15' via a gripper assembly 16', specimen 15' being secured at the opposite end to a bottom plate 17' of a support assembly 18' located within pressure vessel 10'. The upper end of piston accumulator 11' is closed by an end cap 19' having an aperture or opening 23 therein, whereby the portion of accumulator 11' and the upper surface of piston 14' is at atmospheric pressure. Piston accumulator 11" is provided with a lower end cap 24 having an inert gas supply line 20' extending therethrough, whereby the area of accumulator 11' below piston 14' and lower surface of piston 14' is under pressure by fluid or gas such as argon, from a source, not shown. Piston 14' is provided with O-ring seals 21' (two in this embodiment).

Fitting-seal assembly 22, as illustrated in detail in FIG. 3, comprises a Teflon seal 25 contained within a modified conax type fitting, generally indicated at 26, and composed of a body member 27, cap or connector member 28 and thrust collar 29, Teflon seal 25 and thrust collar 29 being located within a cavity 30 formed in body member 27. Body member 27 and cap member 28 are threadedly interconnected at 31, with thrust collar 29 being welded at 32 to cap member 28. Body member 27 is provided with a threaded end portion 33 which is secured into a tapped hole 34 in pressure vessel 10'. A nipple 35 having threaded end portion 36 is welded to cap member 28, as indicated at 37, the end portion 36 being adapted for connection to nipple 12' of FIG. 2, through which pull rod 13' passes.

In the stressing device illustrated in FIGS. 2 and 3, the system (interior of pressure vessel 10') is sealed thermally and hydraulically from the piston 14' by Teflon seal 25, contained within conax type fitting 26. The Teflon seal 25 allows free vertical movement of the pull rod 13 and also provides a pressure seal of the hot system fluid, which as pointed out above may be from 500° to 600°F and at pressures up to 1750 psi. The desired stress is applied to specimen 15' by directing inert gas, such as argon, through gas inlet 20' pressurizing the piston accumulator 11' at the bottom of piston 14'. Typically regulated pressures of 100 to 300 psi are used below piston 14' to obtain a range of stress levels on the tensile specimens 15'. These low pressures result in simpler sealing techniques and less chance of leakage. Also, O-rings 21' in the piston 14', may be made of rubber, for example, and operate just slightly above room temperature, thereby substantially increasing the life thereof. The top side of piston 14 is at atmospheric pressure via aperture 23 in top cap 19' or may be connected to a return line to the argon supply in case of leakage about O-rings 21'. Also, if desired the aperture 23 may be closed.

With nipple 35 connected to nipple or pipe 12', pull rod 13' passes through thrust collar 29 and Teflon seal 25, an annulus 38 being formed between pull rod 13' and nipple 35 which contains the pressurized gas from the area of piston accumulator 11' below piston 14'. Weld 32 functions as a seal to prevent gas leakage to the atmosphere between the top of thrust collar 29 and cap member 28. Leakage around the bottom of thrust collar 29 is prevented by sealing against the top of Teflon seal 25, this sealing relationship not being shown for purposes of more clearly illustrating the components of fitting-seal assembly 22.

Stressing devices, made as illustrated in FIGS. 2 and 3, have been tested for several hundred trouble free hours of service with a system temperature of 600°F and a system pressure of 1750 psi. A calibration run has shown that under the above system conditions, less than 10 psi is necessary to move the piston, indicating free movement of pull rod and piston.

It has thus been shown that the present invention provides a simpler and more reliable means for maintaining a precise stress on a tensile specimen, thereby providing an advance in the state of the art, particularly for high temperature aqueous stress corrosion testing.

While a particular embodiment of the invention has been illustrated and described, modifications will become apparent to those skilled in the art, and it is intended to cover in the appended claims all such modifications as come within the spirit and scope of the invention.

What we claim is:

1. A device for stressing tensile specimens contained within a high temperature, high pressure system comprising: means for securing a specimen to be tested within a pressure vessel, means for connecting a specimen to be tested to a pressure actuated means located externally of said pressure vessel, said connecting means including a pull rod connected at one end thereof to means for gripping a specimen to be tested and at the opposite end to said pressure actuated means, said pressure actuated means comprising a piston accumulator having a piston movable therein and secured to said pull rod and having means for directing fluid pressure to said piston for moving same thereby stressing a specimen to be tested, and means mounted with respect to said connecting means external of each said pressure vessel and said pressure actuated means for preventing hydraulic and thermal interaction between pressure and temperature within said pressure vessel and said pressure actuated means comprising a fitting-seal assembly secured intermediate said pressure vessel and said pressure actuated means, said pull rod extending through said fitting-seal assembly, said fitting-seal assembly including a Teflon seal positioned about said pull rod preventing leakage of fluid therethrough while allowing free movement of said pull rod, said fitting-seal assembly additionally including a fitting having a body member defining a passageway therethrough for passage of said pull rod with said passageway having an enlarged end section defining a cavity, and a cap member removably secured to said body member and having an aperture therein through which said pull rod passes, said Teflon seal being located within said cavity of said body member, said fitting also including a thrust collar fixedly secured to said cap member and positioned in said cavity of said body member about said pull rod and adjacent said Teflon seal, said body member additionally including a threaded end portion secured in a threaded opening in said pressure vessel, and said cap member being provided with a nipple aligned with said aperture therein and having a threaded end portion removably secured to a nipple-like member surrounding said pull rod and secured to said pressure actuated means.

* * * * *